US007239635B2

(12) United States Patent
Ozguner (10) Patent No.: US 7,239,635 B2
(45) Date of Patent: Jul. 3, 2007

(54) METHOD AND APPARATUS FOR IMPLEMENTING ALTERATIONS ON MULTIPLE CONCURRENT FRAMES

(75) Inventor: Tolga Ozguner, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1106 days.

(21) Appl. No.: 10/180,993

(22) Filed: Jun. 27, 2002

(65) Prior Publication Data
US 2004/0001484 A1   Jan. 1, 2004

(51) Int. Cl.
H04L 12/28 (2006.01)
G06F 15/00 (2006.01)
G06F 13/00 (2006.01)
(52) U.S. Cl. .................. 370/392; 370/470; 712/28; 712/32; 710/5; 710/7
(58) Field of Classification Search ............... None
See application file for complete search history.

(56) References Cited
U.S. PATENT DOCUMENTS
6,259,699 B1* 7/2001 Opalka et al. ............... 370/398
6,694,380 B1* 2/2004 Wolrich et al. ................. 710/5

OTHER PUBLICATIONS
"DSP MircoComputers ADSP-2181/ADSP-2183" by Analog Device, 1996 month not available.*

"Intel IXP1200 Network Processor Family Hardware Reference manual" by Intel Dec. 2001.*
"Distributed Computing Applied to a VLSI Chip" by Maha M. Zaghloul published in IEEE 1990 month not available.*
"Intel IXP1200 Network Processor Family Microcode Programmer's Reference manual" by Intel Mar. 2002(Only provided Cover and Content pages).*

* cited by examiner

Primary Examiner—Wing Chan
Assistant Examiner—Juh-Yih Shue
(74) Attorney, Agent, or Firm—Joan Pennington (57) ABSTRACT

A method and apparatus are provided for implementing frame header alterations on multiple concurrent frames. Each of a plurality of frame data alteration engines includes a pair of a command decoder and an associated data aligner. A command buffer arbiter sequentially receives frame alteration commands and sequentially selects one of the frame data alteration engines for the sequentially received frame alteration commands. Each command decoder receives and decodes frame alteration commands and provides frame alignment commands and alteration instructions and each associated data aligner receives frame data and selectively latches data bytes of the received frame data responsive to the frame alignment commands and sequentially provides an aligned frame data output of a predefined number of bytes. An alteration engine receives sequentially provided aligned frame data output and alteration instructions from a selected one the plurality of frame data alteration engines and provides sequential altered frame data responsive to the received alteration instructions.

18 Claims, 7 Drawing Sheets

PRIOR ART

FIG. 6

METHOD AND APPARATUS FOR IMPLEMENTING ALTERATIONS ON MULTIPLE CONCURRENT FRAMES

FIELD OF THE INVENTION

The present invention relates generally to the data processing field, and more particularly, relates to a method and apparatus for implementing frame header alterations on multiple concurrent frames.

RELATED APPLICATIONS

Related U.S. patent applications by the present inventor and assigned to the present assignee are being filed on the same day as the present patent application including:

U.S. patent application Ser. No. 10/185,552, entitled "METHOD AND APPARATUS FOR IMPLEMENTING FRAME HEADER ALTERATIONS"; and U.S. patent application Ser. No. 10/185,556, entitled "METHOD AND APPARATUS FOR IMPLEMENTING FRAME HEADER ALTERATIONS USING BYTE-WISE ARITHMETIC LOGIC UNITS".

DESCRIPTION OF THE RELATED ART

One of the main functions of a network processor is to take incoming packets or frames, and perform alterations on the headers for the purpose of implementing certain network protocols as required by the application. These alterations can be done in the core processor, but they can often be time consuming and result in high latency and failure to meet the bandwidth requirements of the application.

A higher performance alternative is to have designated logic to perform alterations on frames as instructed by the core processor. In this scenario, a frame or packet comes into the chip, is classified according to its contents, and depending on the software load, dispatched to a frame alteration unit (FAU) with a list of alterations to be performed. The FAU in turn reads the frame or packet data from storage, applies the necessary alterations, and sends the data back out to the network or to another chip in the system for further processing or routing.

Limited speed or the required time to perform the frame alterations remains a significant problem with known frame alteration arrangements. Also known frame alteration arrangements typically are restricted to predefined alterations, lacking the flexibility required to perform frame alterations in a wide variety of protocols and multiple alteration formats that currently exist or that will be developed in the future.

A need exists for an improved mechanism and method for implementing frame header alterations that that enables frame header alterations on multiple concurrent frames.

SUMMARY OF THE INVENTION

A principal object of the present invention is to provide a method and apparatus for implementing frame header alterations on multiple concurrent frames. Other important objects of the present invention are to provide such method and apparatus for implementing frame header alterations on multiple concurrent frames substantially without negative effect and that overcome many of the disadvantages of prior art arrangements.

In brief, a method and apparatus are provided for implementing frame header alterations on multiple concurrent frames. Each of a plurality of frame data alteration engines include a pair of a command decoder and an associated data aligner. A command buffer arbiter sequentially receives frame alteration commands and is coupled to the plurality of frame data alteration engines and sequentially selects one of the frame data alteration engines for the sequentially received frame alteration commands. Each command decoder receives and decodes frame alteration commands and provides frame alignment commands and alteration instructions and each associated data aligner receives frame data and is coupled to the associated command decoder receiving the frame alignment commands. Each associated data aligner selectively latches data bytes of the received frame data responsive to the frame alignment commands and sequentially provides an aligned frame data output of a predefined number of bytes. An alteration engine receives sequentially provided aligned frame data output and alteration instructions from a selected one the plurality of frame data alteration engines and provides sequential altered frame data responsive to the received alteration instructions.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
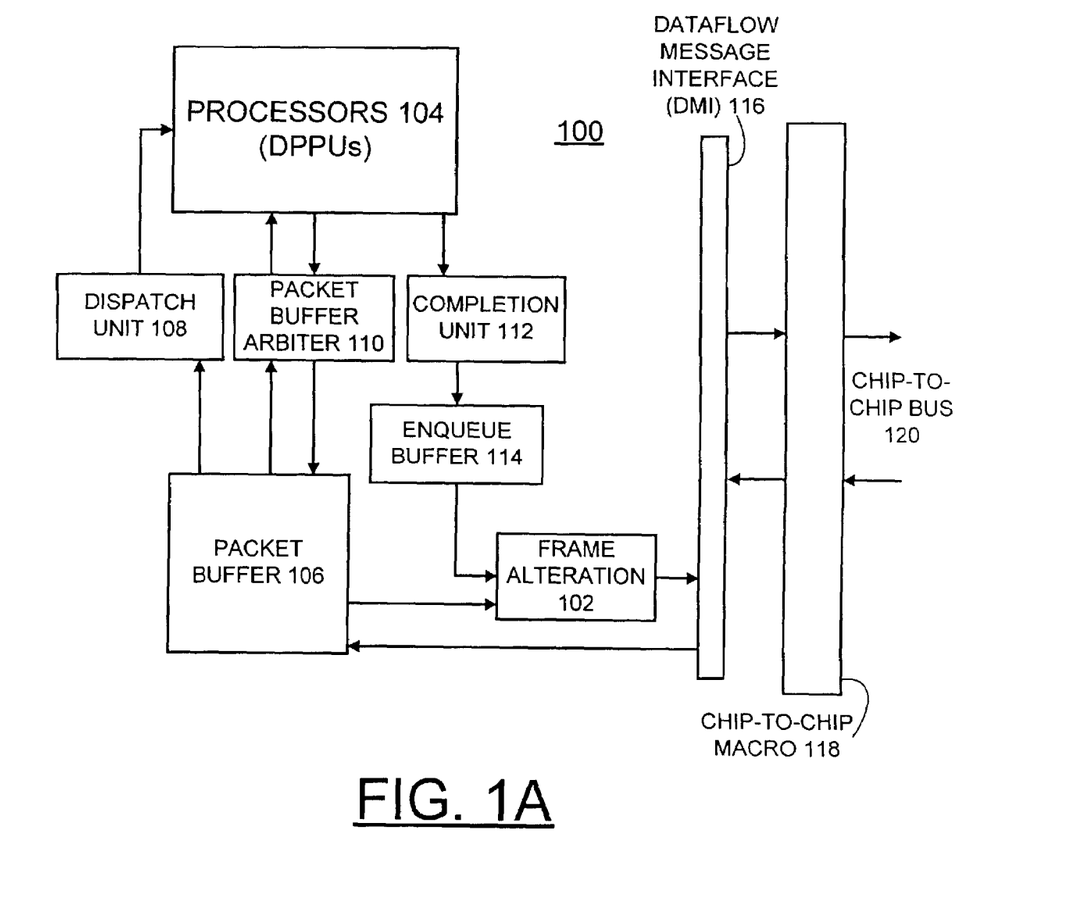
FIG. 1A is block diagram illustrating a data and storage network processor including a frame alteration unit (FAU) in accordance with the preferred embodiment.

Having reference now to the drawings, in FIG. 1A, there is shown a data and storage network chip or network processor 100 including a frame alteration unit (FAU) 102 in accordance with the preferred embodiment. Network processor 100 is shown in simplified form sufficient for understanding the present invention.

Network processor 100 includes a plurality of processors 104, such as distributed pico processor units (DPPUs), and a packet buffer 106 coupled to the processors or DPPUs 104 by a dispatch unit 108 and a packet buffer arbiter 110. The packet buffer 106 receives and stores incoming packet data or frames in an on-chip array, builds descriptors for the frames, and then queues the frames for processing by the processors or DPPUs 104. The dispatch unit 108 sends the frame descriptors to the processors or DPPUs 104. Processors or DPPUs 104 can access packet buffer data via the packet buffer arbiter 110. The packet buffer arbiter 110 has access to all of the memory locations inside of the packet buffer 106. Processors or DPPUs 104 can alter a frame by going through the packet buffer arbiter 110 into the packet buffer 106 and work with the frame in the on-chip array within the packet buffer 106. However, altering the frame in this way can be time consuming.

In accordance with the preferred embodiment, processors or DPPUs 104 create and send frame alteration (FA) commands to the frame alteration unit 102 facilitating faster frame alterations. Once a particular DPPU 104 creates the FA commands, the DPPU sends the frame descriptors along with the FA commands to the frame alteration unit 102 via a completion unit 112, and an enqueue buffer 114. Frame alteration unit 102 receiving the frame descriptors and FA commands, performs frame alterations and sends the altered frame via a dataflow message interface (DMI) 116 and chip-to-chip macro 118 to a chip-to-chip bus 120.

In accordance with features of the preferred embodiment, frame alteration unit 102 has the ability to perform multiple frame alteration concurrently and has high performance capability, for example, to perform frame alterations at a rate of 16 GB/s. Frame alteration unit 102 has the ability to dynamically provide more bandwidth to destinations with higher bandwidth requirements. Frame alteration unit 102 has the ability to perform alterations on multiple frames concurrently, such as alterations four frames concurrently in order to minimize inter frame latency in a high bandwidth application as illustrated and described with respect to FIG. 2A, or to provide lower bandwidth for two or four destinations as illustrated and described with respect to FIGS. 2B and 2C.

Figure 1B:
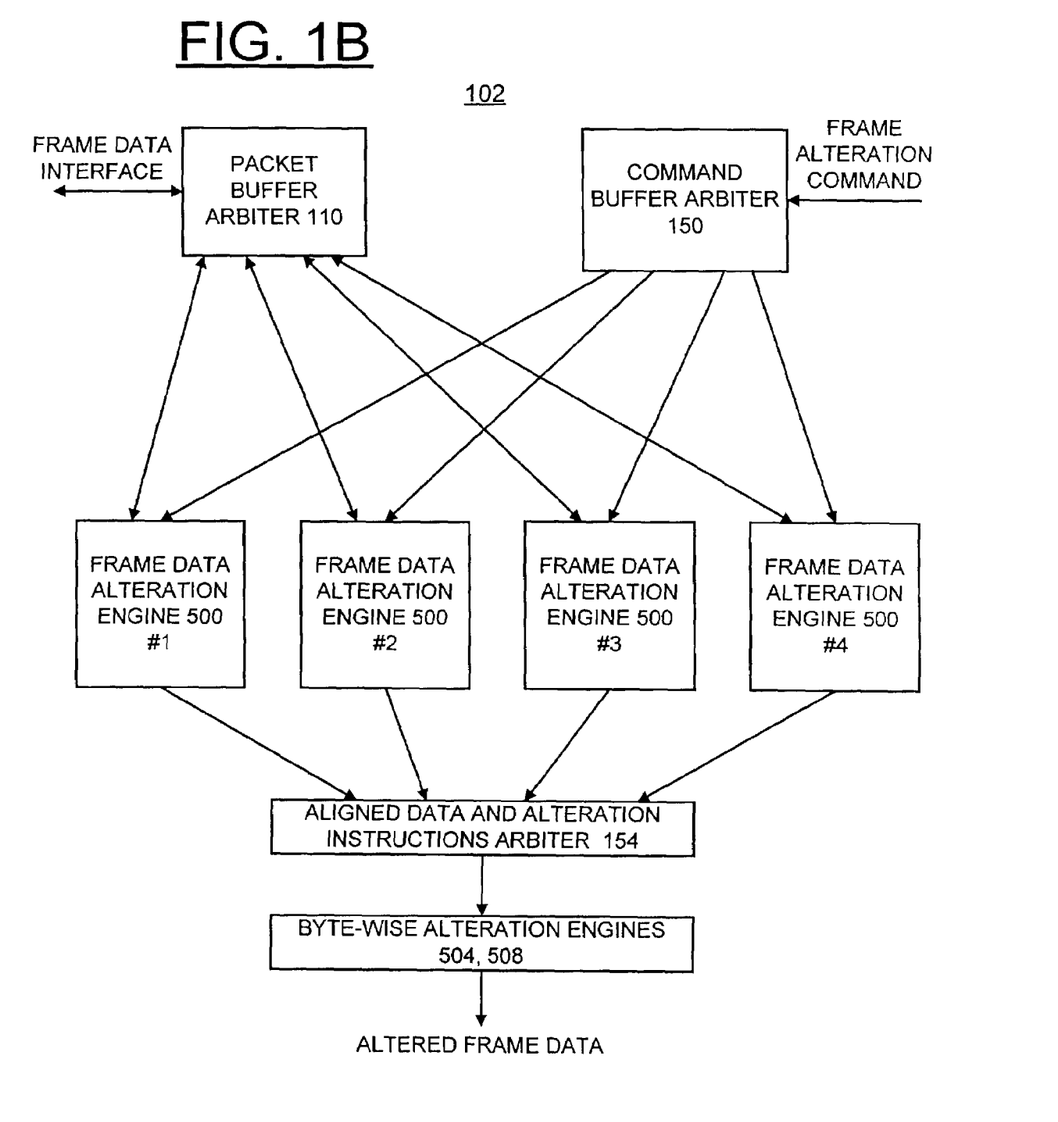
FIG. 1B is a block diagram illustrating a high level architecture of the frame alteration unit (FAU) in the network processor of FIG. 1 in accordance with the preferred embodiment.

Referring now to FIG. 1B, there is shown the high-level architecture of the frame alteration unit 102 of the preferred embodiment. Frame alteration unit 102 includes the packet buffer arbiter 110 for transferring frame data from the packet buffer 106 to the frame alteration unit 102 indicated at a line labeled FRAME DATA INTERFACE. Frame alteration unit 102 includes a command buffer arbiter 150 receiving frame alteration commands and frame descriptors indicated at a line labeled FRAME ALTERATION COMMAND. Frame alteration unit 102 includes a plurality of frame data alteration engines 500, #1–4, coupled to the command buffer arbiter 150 and packet buffer arbiter 110. Frame data alteration engines 500, #1–4 are illustrated and described in FIGS. 4 and 5. Frame alteration unit 102 includes an aligned data and alteration instructions arbiter 154 coupled between the multiple frame data alteration engines 500, #1–4 and byte-wise alteration engines 504, 508. The byte-wise alteration engines 504, 508 are illustrated and described in FIG. 5.

Frame alteration unit 102 operates in two major modes including a full-bus mode and split-bus mode. Frame alteration unit 102 operates in full-bus mode with a single destination for the frames with a high bandwidth requirement, for example, 16 GB/s. Frame alteration unit 102 operates in split-bus mode with either two or four independent destinations for frames, each with either one-half the bandwidth requirement for two destinations, for example, 8 GB/s, or one-quarter the bandwidth requirement for four destinations, for example, 4 GB/s.

Frame alteration commands, as well as information regarding the location of the frame data are applied to the frame alteration unit 102 and applied to the command buffer arbiter 150. The command buffer arbiter 150, depending on the operating mode, sends the frame alteration commands to one of the multiple frame data alteration engines 500, #1–4. In the case of full-bus mode, command buffer arbiter 150 can send frame alteration commands to the first available engine of the multiple frame data alteration engines 500, #1–4. In the case of split-bus mode, the command buffer arbiter 150 can either send the commands to a designated engine 500, #1, 2, 3, or 4 or it can send the commands to any free engine 500, #1, 2, 3, or 4. The command buffer arbiter 150 would send the commands to any free engine 500, #1, 2, 3, or 4 in order to provide a certain output destination more bandwidth.

For example, in full-bus mode, the command buffer arbiter 150 sends a first command to engine 500, #1. If a second command is presented to the FAU 102, command buffer arbiter 150 sends the second command to engine 500, #2 regardless of whether or not engine 500 #1 had freed up. The command buffer arbiter 150 goes through each of the engines 500, #1, 2, 3, and 4 in a round-robin fashion.

Split-bus mode can operate in one of two ways. If each engine 500, #1, 2, 3, and 4 is tied to a specific output destination, then every command for destination 1 can go to engine 1, every command for destination 2 would go to engine 2 and so on. However, to provide more flexible bandwidth allocation, a destination can also be sent to any available engine 500, #1, 2, 3, or 4. Therefore, if more commands are headed to a certain destination, that destination can be allocated more alteration engines of the multiple frame data alteration engines 500, #1–4. In this case, the command buffer arbiter 150 sends the command to the first available engine of the multiple frame data alteration engines 500, #1–4 starting at engine 500, #1. Then the command buffer arbiter 150 also keeps track of the current active frame for each destination in order to preserve per-destination ordering. Once a command is given to a particular alteration engine 500, #1, 2, 3, or 4, the alteration engine will need to request and receive the frame data from the packet buffer 106. Each engine independently requests frame data, however, the packet buffer arbiter 110 selects among the requests according to the mode of operation. Frame storage in packet buffer 106 includes two data structures: frame data and control blocks. The frame data is linked through numerous locations in an SRAM (not shown) in packet buffer 106. The control blocks provide information regarding the contents of the corresponding frame data location such as the number of bytes valid as well as the location of the next frame data. There can be from 1 to 64 bytes valid at each frame data array location within the packet buffer 106.

In Full-Bus Mode, the packet buffer arbiter 110 selects the current frame the majority of the time, while the exact percentage is adjustable. The command buffer arbiter 150 provides the current frame information. Due to latencies to the data structures and frame data storage, one of the alteration engines 500, #1, 2, 3, or 4 cannot continuously request data. As a result, there are cycles in which the current frame of data aligner 402 is not requesting any frame data. To make better use of these cycles, the packet buffer arbiter 110 will allocate a small percentage of cycles to send requests from the next frame. This results in both better utilization of the frame storage to FAU bandwidth, but also allows the following or next frame to start processing and avoid the latency between where the first or current frame is finished and the next or second frame receives data. An additional benefit is that the beginning of the frames is prefetched. Since the beginning of the frame is the location of the header, a majority of the frame alterations as well as awkward alignments with locations of less than 64 bytes valid in the Frame Data SRAM within packet buffer 106 are located in this prefetched section. Prefetching the frame header allows the hiding of potentially high latency accesses.

In Split-Bus Mode, packet buffer arbiter 110 can either select from each engine on an equal basis if each engine 500, #1, 2, 3, and 4 is tied to a destination, or the packet buffer arbiter 110 can use a hybrid approach in which the packet buffer arbiter 110 selects from the current frames a high percentage of the time, while occasionally selecting a next or secondary frame request data.

The aligned data and alteration instruction arbiter 154 selects a predetermined number of aligned data bytes and instructions, such as 16 bytes of aligned data and 32 micro commands for the byte-wise alteration engines 504, 508 from the four engines 500, #1–4. The function of aligned data and alteration instruction arbiter 154 is also dependent on the mode of operation for the frame alteration unit 102. In full-bus or full-frame mode, the aligned data and alteration instruction arbiter 154 selects from the particular engine 500, #1, 2, 3, or 4 with the current frame in process until that frame is finished. The command buffer arbiter 150 provides the current frame information indicated at a line labeled ENQUEUE ORDER INFO in FIG. 4. In split-bus mode, the aligned data and alteration instruction arbiter 154 selects from each of the four engines 500, #1–4 in a round-robin fashion. If more than one engine of the four engines 500, #1–4 has a frame intended for a single destination, then the arbiter 154 only chooses the current frames to keep proper frame ordering.

The end result at the output of the byte-wise alteration engines 504, 508 is altered frame data with all of the requested alterations performed. The multiple alteration engines 500 and the byte-wise alteration engines 504, 508 as well as the arbiters 110, 150, and 154 provide the frame alteration unit 102 with the flexibility of servicing multiple destinations, or the multiple alteration engines 500, the byte-wise alteration engines 504, 508 and the arbiters 110, 150, and 154 can be used to hide frame data access latencies in order to provide high bandwidth for fewer output destinations.

Figure 2A:
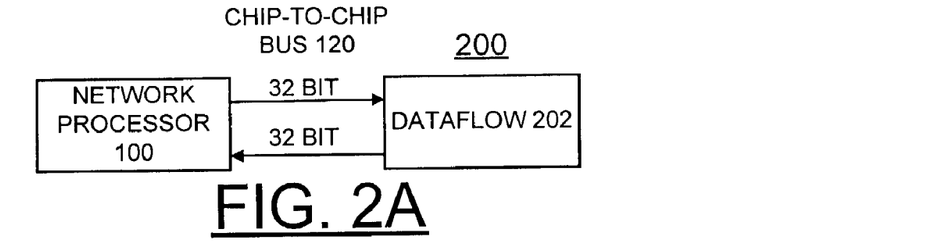
FIGS. 2A, 2B, and 2C are diagrams illustrating exemplary multiple point-to-point bus configurations of the data and storage network processor of FIG. 1 in accordance with the preferred embodiment.
Figure 2B:
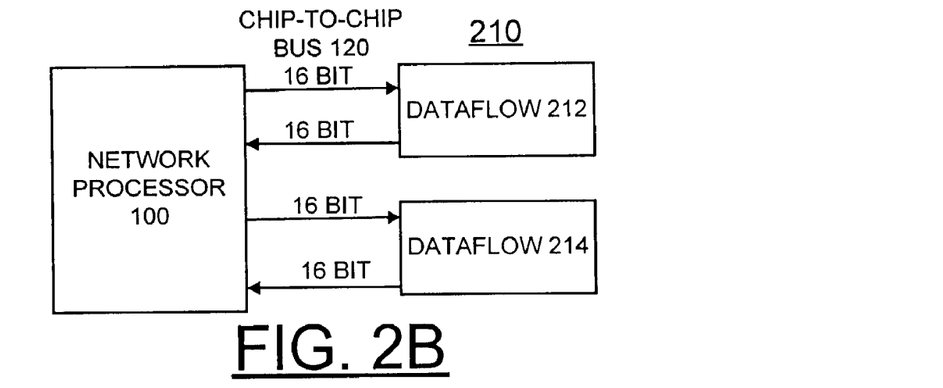
Figure 2C:
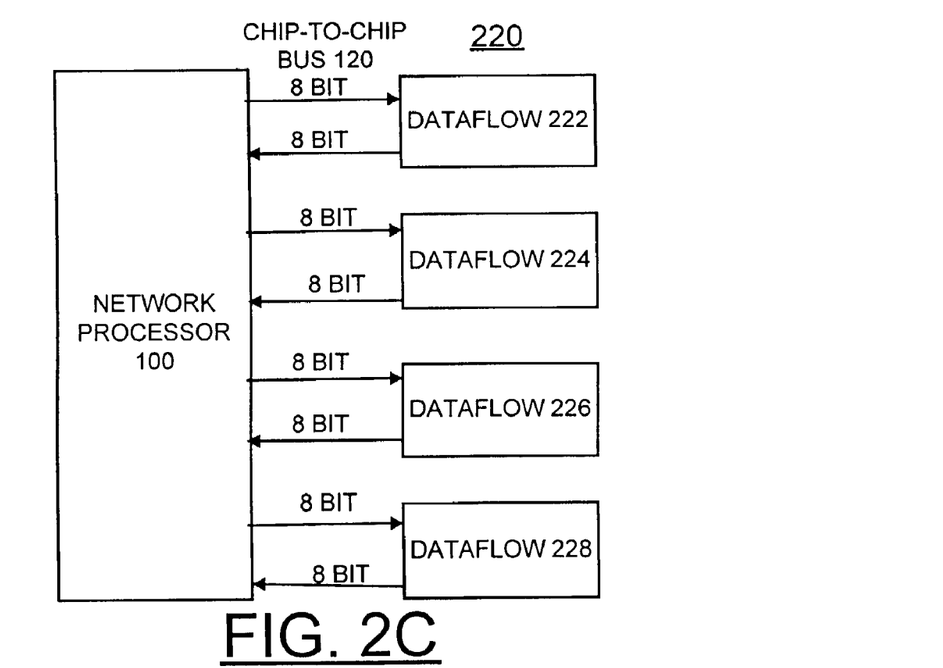

Referring now to FIGS. 2A, 2B, and 2C, exemplary multiple programmable point-to-point bus configurations of the 32-bit chip-to-chip bus 120 selectively configured in various combinations of a 32-bit, 16-bit or 8-bit busses of the data and storage network processor 100. FIG. 2A illustrates a first configuration generally designated by 200 of the network processor 100 with the chip-to-chip bus 120 configured as 32-bit bus for a single destination dataflow 202. FIG. 2B illustrates a second configuration generally designated by 210 of the network processor 100 with the chip-to-chip bus 120 configured as 16-bit busses for a pair of independent dataflows 212 and 214. FIG. 2C illustrates a third configuration generally designated by 220 of the network processor 100 with the chip-to-chip bus 120 configured as 8-bit busses for four independent dataflows 222, 224, 226, and 228.

Figure 3A:
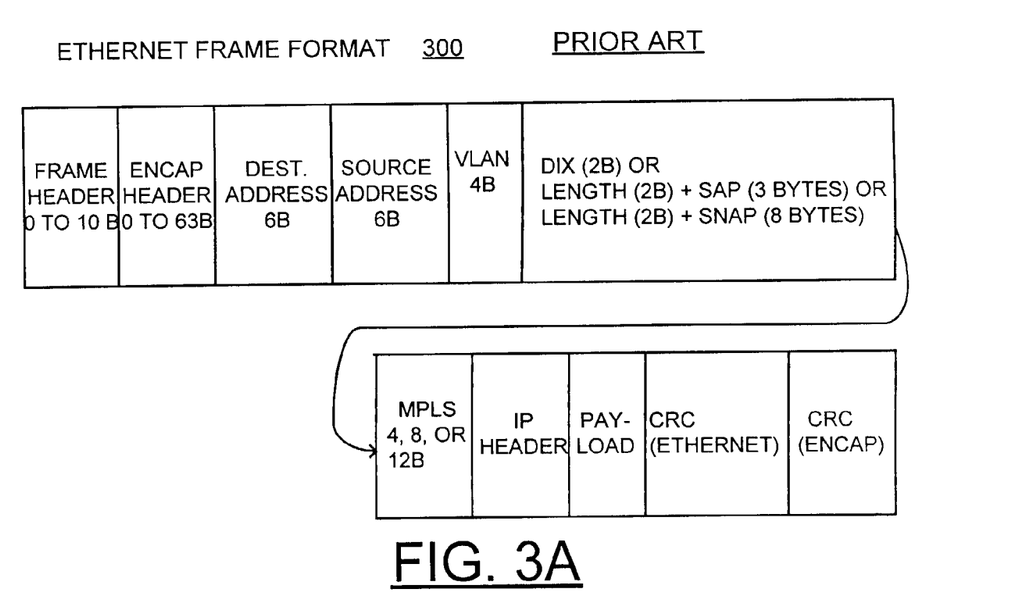
FIGS. 3A and 3B are diagrams respectively illustrating a conventional format of an Ethernet frame and Packet over Sonet (POS) packet that include multiple header fields that can be changed, inserted or deleted using the frame alteration unit (FAU) in accordance with the preferred embodiment.
Figure 3B:
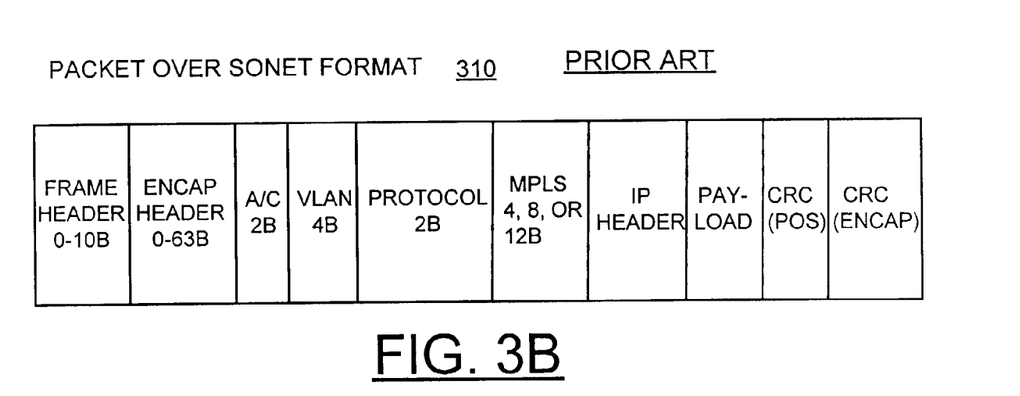

FIGS. 3A and 3B respectively illustrate a conventional format of an Ethernet frame generally designated 300 and Packet over Sonet (POS) packet generally designated 310 that include multiple header fields that can be changed, inserted or deleted using the frame alteration unit 102 in accordance with the preferred embodiment.

Figure 4:
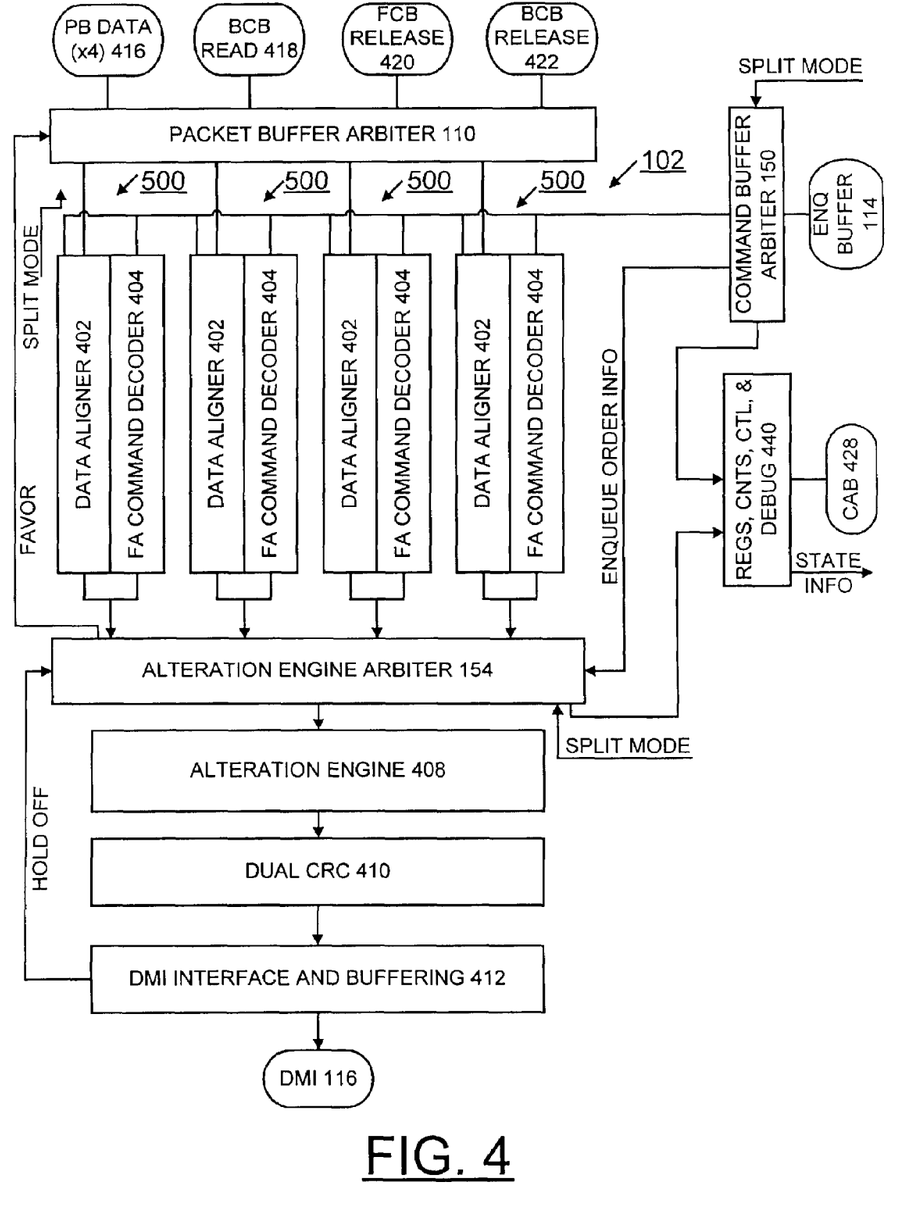
FIGS. 4 and 5 are block diagrams illustrating the frame alteration unit (FAU) of the data and storage network processor of FIGS. 1A and 1B in accordance with the preferred embodiment.
Figure 5:
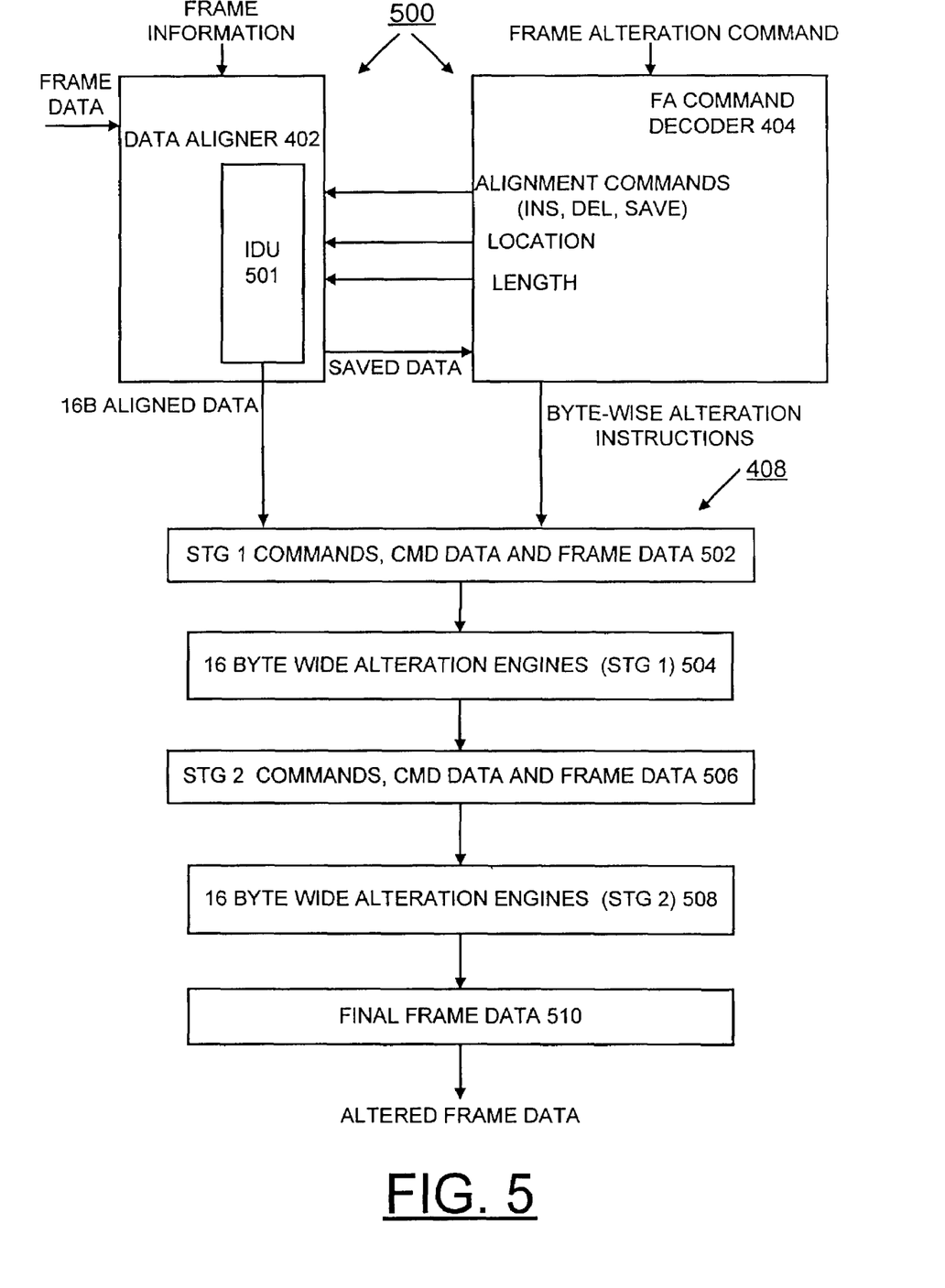

Referring now to FIG. 4, frame alteration unit 102 includes a plurality of pairs generally designated by 500 of a data aligner 402 and a frame alteration (FA) command decoder 404. A respective pair of the multiple data aligner 402 and frame alteration (FA) command decoder pairs 500 corresponds to the frame data alteration engines 500, #1–4 and are coupled to the alteration engine or aligned data and alteration instruction arbiter 154. The packet buffer arbiter 110 is coupled to each of the four data aligners 402 providing packet buffer data. Frame alteration unit 102 includes an alteration engine 408 coupled to a dual cyclic redundancy check (CRC) block 410 and a dataflow message interface (DMI) and buffering block 412. The alteration engine 408 including two stages of byte-wise alteration engines 504 and 508, as illustrated in FIG. 5. Interconnects to the frame alteration unit 102 are shown in oval shapes.

The dataflow message interface (DMI) 116 is coupled to the DMI and buffering block 412. A packet buffer (PB) data 416, a buffer control block (BCB) read 418, a frame control block (FCB) release 420, and a BCB release 422 are coupled to the packet buffer arbiter 110. The enqueue buffer 114 is coupled to the command buffer arbiter 150. The command buffer arbiter 150 is coupled to each of the data aligners 402 and the frame alteration command decoders 404 providing FA commands and frame descriptors. A control access bus (CAB) interface 428 is coupled to configuration registers, counts, control, and debug logic 430 that provides state information. A split mode control signal indicated at lines labeled SPLIT MODE is applied the packet buffer arbiter 110, command buffer arbiter 150, and alteration engine arbiter 154. DMI and buffering block 412 applies a timing control signal to the alteration engine arbiter 154 indicated at a line labeled HOLDOFF. Command buffer arbiter 150 applies an enqueue control signal to the alteration engine arbiter 154 indicated at line labeled ENQUEUE ORDER INFO. The alteration engine arbiter 154 applies a control signal to the packet buffer arbiter 110 indicated at a line labeled FAVOR.

It should be understood that the frame alteration unit 102 is not limited to the illustrated arrangement of FIGS. 1B, and 4; for example, either a greater or a fewer number of data aligner and frame alteration decoder pairs can be used, if required by a particular application.

Referring also to FIG. 5, one frame data alteration engine generally designated 500 including one pair of the data aligner 402 and frame alteration (FA) command decoder 404 is shown coupled to the alteration engine arbiter 154. Data aligner 402 receives frame information and frame data from packet buffer 106 in segments of 1 to 64 bytes each transfer, concatenates the frame data together, and realigns the frame data to make space for data inserts or remove data for deletes as instructed by the FA command decoder 404. At its output, the data aligner 402 provides 16 bytes (16B) of aligned data per cycle. FA command decoder 404 decodes the commands sent to the frame alteration unit 102, and provides individual inserts and delete instructions to the data aligner 402 indicated at a line ALIGNMENT COMMANDS (INS, DEL, SAVE). A position and length of each insert and delete instruction also is provided by FA command decoder 404 to the data aligner 402. There can be multiple inserts and deletes per frame, for example, six inserts and deletes per frame depending on the type of headers the frame needs. Data aligner 402 provides save data to the FA command decoder 404 indicated at a line labeled SAVE DATA including a portion of one or more deletes per frame that is needed for providing the required final frame data, for example, to provide an updated time-to-live (TTL) value.

Data aligner 402 includes an insertion and deletion unit (IDU) 501 receiving the inserts and delete instructions together with the position and length from the FA command decoder 404 and 16B frame data per cycle. IDU 501 provides 16B of aligned frame data per cycle to the alteration engine 408. Alteration engine 408 includes a first stage commands, command data and frame data registers 502 receiving first and second stage aligned data per cycle from the data aligner IDU 501 and first and second stage byte-wise alteration instructions from the FA command decoder 404. Alteration engine 408 includes a first stage of 16 byte wide alteration engines 504 having input coupled to the first stage commands, command data and frame data registers 502 and an output coupled to a second stage commands, command data and frame data registers 506. Alteration engine 408 includes a second stage of 16 byte wide alteration engines 508 having input coupled to the second stage commands, command data and frame data registers 506 and an output coupled to a final frame data registers 510 providing the altered frame data.

FA command decoder 404 also provides byte-wise alteration instructions, such as 32 byte-wise micro commands, each cycle to the alteration engine 408. FA command decoder 404 also provides the operands for these commands. The micro commands enable operations such as load, add, and, or, move, and the like used by the two-stage byte-wise alteration engines 504 and 508 forming the alteration engine 408 to actually perform the alterations or combine new header data into the stream of frame data. The micro commands can be used to load in value of fields that were inserted using the IDU 501, overlay values to certain fields, increment or decrement fields, as well as numerous other frame alterations commonly used in networking protocols. As with the IDU 501, these alteration engines 504 and 508 provide the flexibility to work with a variety of protocols, with the command decoder 404 providing the alteration commands for both the IDU 501 and the alteration engines 504 and 508.

In a multi-protocol label switching (MPLS) network, incoming packets are assigned a label by a label edge router (LER). Packets are forwarded along a label switch path (LSP) where each label switch router (LSR) makes forwarding decisions based solely on the contents of the label. At each hop, the LSR strips off the existing label and applies a new label which tells the next hop how to forward the packet. Label Switch Paths (LSPs) are established by network operators for a variety of purposes, such as to guarantee a certain level of performance to route around network congestion, or to create IP tunnels for network-based virtual private networks. In many ways, LSPs are similar to circuit-switched paths in ATM or Frame Relay networks, except that LSPs are not dependent on particular Layer 2 technology. An LSP can be established that crosses multiple Layer 2 transports such as ATM, Frame Relay or Ethernet. Thus, one of the true promises of MPLS is the ability to create end-to-end circuits, with specific performance characteristics, across any type of transport medium, eliminating the need for overlay networks or Layer 2 only control mechanisms.

Frame alteration unit 102 can be used to perform MPLS, LER and LSR functionally within the network processor 100 to perform changes to the MPLS packet at peak performance instead of going through conventional long software paths. Frame alteration unit 102 also provides a flexible approach to implement unforeseen MPLS uses by allowing the capability to deal with multiple labels and all fields within a label.

Figure 6:
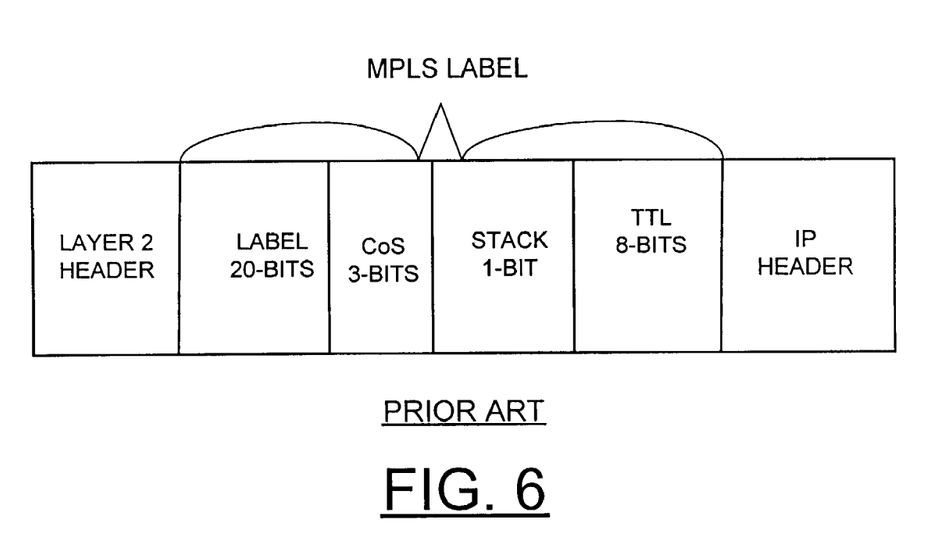
FIG. 6 is a diagram illustrating a conventional label format of a Multi-Protocol Label Switching (MPLS) packet that includes multiple fields that can be changed, inserted or deleted using the frame alteration unit (FAU) in accordance with the preferred embodiment.

Referring now to FIG. 6, a conventional Label format of a Multi-Protocol Label Switching (MPLS) packet that includes multiple fields that can be changed, inserted or deleted using the frame alteration unit 102 in accordance with the preferred embodiment. The 32-bit MPLS Label is located after the Layer 2 header and before the IP header. As shown in FIG. 6, the MPLS Label contains multiple fields including a label field of 20-bits that carries the actual value of the MPLS Label; a CoS field of 3-bits that can affect the queuing and discard algorithms applied to the MPLS packet as it is transmitted through the network; a 1-bit Stack field that supports a hierarchical label stack and a TTL (time-to-live) field of 8-bits that provides conventional IP TTL functionality.

When entering an MPLS network, the LER typically inserts one MPLS Label between the Layer 2 and Layer 3 headers. Frame alteration unit 102 supports the insertion of multiple MPLS labels. The TTL field within the labels is copied from the IP TTL field. This is an MPLS label insertion. An LSR will typically remove the old label, and replace it with a new label. The TTL is decremented, the CoS bit can be changed and the S bit is usually preserved. This is an MPLS label swap. When leaving the MPLS network, all remaining MPLS labels will be removed. The TTL field will be copied back from the top MPLS label to the IP TTL field. This is an MPLS label delete.

Frame alteration unit 102 can perform multiple MPLS label inserts, deletes and swaps, with the option of changing or preserving the CoS, stack and TTL fields as well as the 20-bit label.

MPLS alterations commands are applied to the FA command decoder 404 of the FAU 102. The DPPUs 104 in the network processor 100 generates the MPLS alterations commands. The commands specify what sort of MPLS alterations need to be performed (inserts, swaps or deletes), the number of labels to be swapped, inserted or deleted (or a combination of swaps with inserts or deletes), what to do with the TTL, S-bit and CoS fields, label data, and the locations of the Layer 2 and Layer 3 headers.

The FA command decoder 404 decodes the MPLS alterations commands into a collection of insert/delete/save commands for the IDU 501. The commands given to the IDU 501 have the following 3 forms: 1.) Insert, Location, Length that is used for MPLS pushes and can support any number of MPLS labels; 2.) Delete, Location, Length that is used for MPLS Pops; and 3.) Save, Location that is used for a byte-wise save of either old MPLS TTLs before they are deleted, an IP TTL, or IPv4 checksums if updating is needed.

IDU 501 provides aligned data with the proper formatting. Deleted data is removed and space is provided for inserted data. IDU 501 will also provide the FA command decoder 404 with a saved data, such as the MPLS TTL, if necessary. The IDU output 16B of aligned data is applied to the alteration engines 504, 508.

FA command decoder 404 provides the alteration engines 504, 508 with the proper byte-wise alteration commands to perform the necessary alteration commands. For inserting labels, FA command decoder 404 provides the label data. Using either the save function of the IDU 501 or the save and load functions of the alteration engines 504, 508, the IP TTL is copied to the MPLS TTL if necessary.

For an MPLS Swap, FA command decoder 404 gives the alteration engines 504, 508 load commands for the swapped label, and a combination of AND and OR commands to change or preserve the CoS or stack fields. The TTL field can be decremented using the alteration engines ADD command or loaded in if desired.

For the MPLS Pop, FA command decoder 404 receive the popped TTL from the IDU 501, then the popped TTL is provided into the proper location using a LOAD command to one of the alteration engines 504, 508. The TTL can be decremented in alteration engines 508 with an ADD command. If the final MPLS label was popped, then FA command decoder 404 can place the TTL into the IP TTL field in the same way. In the case of an IPv4 packet, the incremental checksum update can be calculated either using the alteration engine ADD commands, or calculated internally in the FA command decoder 404 using the IDU save data and then loaded into the proper location.

While the present invention has been described with reference to the details of the embodiments of the invention shown in the drawing, these details are not intended to limit the scope of the invention as claimed in the appended claims.

What is claimed is:

1. Apparatus for implementing frame header alterations on multiple concurrent frames comprising:
    a plurality of frame data alteration engines, each of said plurality of frame data alteration engines including a command decoder and an associated data aligner;
    a command buffer arbiter sequentially receiving frame alteration commands coupled to said plurality of frame data alteration engines, and said command buffer arbiter sequentially selecting one of said frame data alteration engines for each of said sequentially received frame alteration commands;
    each said command decoder receiving and decoding frame alteration commands and providing frame alignment commands and alteration instructions; and each said associated data aligner receiving frame data and coupled to said associated command decoder receiving said frame alignment commands; each said associated data aligner selectively latching data bytes of said received frame data responsive to said received frame alignment commands and sequentially providing an aligned frame data output of said predefined number of bytes; and
    an alteration engine coupled to said plurality of frame data alteration engines receiving said sequentially provided aligned frame data output of said predefined number of bytes and said alteration instructions from a selected one of said plurality of frame data alteration engines and, said alteration engine providing sequential altered frame data responsive to said received alteration instructions.

2. Apparatus for implementing frame header alterations on multiple concurrent frames as recited in claim 1 includes a mode control signal applied to said command buffer arbiter; and wherein said command buffer arbiter is responsive to said mode control signal for sequentially selecting said one of said frame data alteration engines for said sequentially received frame alteration commands.

3. Apparatus for implementing frame header alterations on multiple concurrent frames as recited in claim 2 wherein said mode control signal is a full-bus mode control signal and wherein said command buffer arbiter is responsive to said full-bus mode control mode control signal for sequentially selecting a first available one of said frame data alteration engines for said sequentially received frame alteration commands.

4. Apparatus for implementing frame header alterations on multiple concurrent frames as recited in claim 2 wherein said mode control signal is a full-bus mode control signal and wherein said command buffer arbiter is responsive to said full-bus mode control mode control signal for sequentially selecting each of said frame data alteration engines in a predefined order for said sequentially received frame alteration commands.

5. Apparatus for implementing frame header alterations on multiple concurrent frames as recited in claim 2 wherein said mode control signal is a split-bus mode control signal and wherein each said sequentially received frame alteration commands include one of a plurality of destinations; and wherein said command buffer arbiter responsive to said split-bus mode control mode control signal for sequentially selecting a designated one of said frame data alteration engines for each said destination for said sequentially received frame alteration commands.

6. Apparatus for implementing frame header alterations on multiple concurrent frames as recited in claim 5 wherein one destination is allocated use of multiple frame data alteration engines and wherein said command buffer arbiter for sequentially selecting a first available one of said frame data alteration engines for said one destination for said sequentially received frame alteration commands.

7. Apparatus for implementing frame header alterations on multiple concurrent frames as recited in claim 1 includes a packet buffer storing said frame data and a packet buffer arbiter coupled to said packet buffer sequentially receiving frame data and coupled to said plurality of frame data alteration engines sequentially selecting one of said frame data alteration engines for said sequentially received frame data.

8. Apparatus for implementing frame header alterations on multiple concurrent frames as recited in claim 7 includes a mode control signal applied to said command buffer arbiter; and wherein said packet buffer arbiter is responsive to said mode control signal for sequentially selecting said one of said frame data alteration engines for said sequentially received frame data.

9. Apparatus for implementing frame header alterations on multiple concurrent frames as recited in claim 1 includes an aligned data and alteration instructions arbiter coupled between said alteration engine and said plurality of frame data alteration engines for selecting said aligned frame data output and said alteration instructions from one of said frame data alteration engines.

10. Apparatus for implementing frame header alterations on multiple concurrent frames as recited in claim 9 includes a mode control signal applied to said aligned data and alteration instructions arbiter; and wherein said aligned data and alteration instructions arbiter is responsive to said mode control signal for sequentially selecting said aligned frame data output and said alteration instructions from one of said frame data alteration engines.

11. Apparatus for implementing frame header alterations on multiple concurrent frames as recited in claim 1 wherein said alteration engine includes first stage byte-wide alteration engines and second stage byte-wide alteration engines.

12. A method for implementing frame header alterations on multiple concurrent frames in a network processor including a plurality of distributed pico processor units (DPPUs) generating frame alteration commands coupled to a frame alteration unit, said method comprising the steps of:

providing a plurality of frame data alteration engines, each of said plurality of frame data alteration engines including a command decoder and an associated data aligner;

sequentially selecting one of said frame data alteration engines for each sequentially received frame alteration commands and received frame data;

utilizing each said command decoder receiving and decoding frame alteration commands and sequentially providing frame alignment commands and alteration instructions; and utilizing each said associated data aligner selectively latching data bytes of said received frame data responsive to said received frame alignment commands and sequentially providing; and sequentially selecting one of said frame data alteration engines for applying said predetermined number of bytes of aligned frame data together with said alteration instructions to an alteration engine, and said alteration engine providing sequential altered frame data responsive to said received alteration instructions.

13. A method for implementing frame header alterations on multiple concurrent frames as recited in claim 12 wherein the steps of sequentially selecting one of said frame data alteration engines for said sequentially received frame alteration commands includes the steps of identifying a mode of the frame alteration unit.

14. A method for implementing frame header alterations on multiple concurrent frames as recited in claim 13 includes the steps responsive to identifying a full-bus mode, sequentially selecting a first available one of said frame data alteration engines for said sequentially received frame alteration commands.

15. A method for implementing frame header alterations on multiple concurrent frames as recited in claim 13 includes the steps responsive to identifying a full-bus mode, sequentially selecting each of said frame data alteration engines in a predefined order for said sequentially received frame alteration commands.

16. A method for implementing frame header alterations on multiple concurrent frames as recited in claim 13 wherein each said sequentially received frame alteration commands include one of a plurality of destinations; includes the steps responsive to identifying a split-bus mode, sequentially selecting a designated one of said frame data alteration engines for each said destination for said sequentially received frame alteration commands.

17. A method for implementing frame header alterations on multiple concurrent frames as recited in claim 16 includes the steps of allocating one destination use of multiple frame data alteration engines and sequentially selecting a first available one of said frame data alteration engines for said one destination for said sequentially received frame alteration commands.

18. A method for implementing frame header alterations on multiple concurrent frames as recited in claim 13 includes the steps of providing an aligned data and alteration instructions arbiter coupled between said alteration engine and said plurality of frame data alteration engines, utilizing said aligned data and alteration instructions arbiter for selecting said aligned frame data output and said alteration instructions from one of said frame data alteration engines responsive to identifying said mode of the frame alteration unit.

* * * * *